US006868487B2

(12) United States Patent
Beeston et al.

(10) Patent No.: US 6,868,487 B2
(45) Date of Patent: Mar. 15, 2005

(54) DATA STORAGE DEVICE AND METHOD FOR STORING INFORMATION USING ALTERNATE INFORMATION STORAGE ARCHITECTURES

(75) Inventors: Ralph Thomas Beeston, Tucson, AZ (US); Kirby Grant Dahman, Tucson, AZ (US); Christopher Paul Grunow, Tucson, AZ (US); Joel Kenneth Lyman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 09/968,592

(22) Filed: Oct. 1, 2001

(65) Prior Publication Data

US 2003/0065683 A1 Apr. 3, 2003

(51) Int. Cl.[7] .............................................. G06F 12/00
(52) U.S. Cl. ........................... 711/172; 711/4; 345/533
(58) Field of Search .................... 711/4, 149, 170–173; 370/395.7; 365/230.03; 345/533

(56) References Cited

U.S. PATENT DOCUMENTS

| | | | | |
|---|---|---|---|---|
| 5,737,767 A | * | 4/1998 | Agrawal et al. | ............ 711/171 |
| 6,049,501 A | * | 4/2000 | Pantelakis et al. | ..... 365/230.03 |
| 6,081,528 A | * | 6/2000 | Thomann | ................. 370/395.7 |
| 6,621,496 B1 | * | 9/2003 | Ryan | .......................... 345/533 |

OTHER PUBLICATIONS

IBM, DFSMS/MVS Version 1 Release 3, GC26–4900–04, General Information, 1980, pp. 1–155.
IBM, DFSMS/MVS Version 1 Release 4, GC26–4900–05, General Information, 1980, pp. 1–167.
IBM, DFSMS/MVS Version 1 Release 3, SH21–1076–02, General Information, 1984, pp. 1–594.

* cited by examiner

*Primary Examiner*—Nasser Moazzami
(74) *Attorney, Agent, or Firm*—Dale F. Regelman

(57) ABSTRACT

A data storage device having a fixed device architecture capable of operating in a first capacity mode or in a second capacity mode, and capable of switching between that first capacity mode and that second capacity mode. In certain embodiments, the first capacity mode utilizes a 22 bit blockid format and the second capacity mode utilizes a 32 bit blockid format. In other embodiments, the first capacity mode utilizes a 32 bit blockid format and the second capacity mode utilizes a 22 bit blockid format.

A data storage device comprising a computer useable medium having computer readable program code disposed therein for recording information in alternative information storage architectures. A data storage and retrieval system which includes one or more of Applicants' data storage devices.

A computer code product comprising a data management system which supports the capability to record information on a data storage medium using alternative information storage architectures.

50 Claims, 9 Drawing Sheets

DATA STORAGE DEVICE AND METHOD FOR STORING INFORMATION USING ALTERNATE INFORMATION STORAGE ARCHITECTURES

FIELD OF THE INVENTION

Applicants' invention relates to a data storage device to record information in alternative information storage architectures on a data storage medium.

BACKGROUND OF THE INVENTION

An explosion of computer data and information requires an ever increasing amount of computer readable storage space. Increasing data storage capacity requires improved storage management systems to backup and protect data sets, and migrate less active data sets to secondary storage to increase primary storage space. A data set consists of any collection or grouping of data. In certain systems, a data set may include control information used by the system to manage the data. The terms data set and file are generally equivalent and sometimes are used interchangeably. Hierarchical storage management (HSM) programs manage storage devices, such as tape libraries, to control the flow of data between primary and secondary storage facilities.

In a hierarchical storage management system, data is stored in different types of storage devices depending upon the frequency of usage of the data. For instance, a system may include multiple storage media types to store data having different usage patterns and likelihoods of access. More frequently used data may be stored on direct access storage devices (DASD) comprising high-performance rapid access storage devices, such as hard disk drives. Such readily accessible data is sometimes referred to as level zero volumes. Less frequently used data may be archived on slower and less expensive, demountable storage media, such as optical disks, magnetic tape cartridges, etc. Such archive volumes are often referred to as level two storage.

Two common functions initiated by host systems in hierarchical storage management systems include migration and recall. Migration involves the movement of data from level 0 to level 1 or to level 2 storage to make more room for more frequently accessed data on the primary level 0 storage devices. If a host system attempts to access a data set that has been migrated to level 1 or level 2 storage, then the recall function would be initiated to move the requested data sets to level 0.

International Business Machines Corporation (IBM®) provides the Data Facilities Storage Management Subsystem (DFSMS®) software which is included in the IBM MVS/ESA™, OS/390®, and z/OS® operating systems. This software allows host systems to perform hierarchical storage management operations, such as migration and recall. DFSMS and OS/390 are registered trademarks of IBM, and MVS/ESA is a trademark of IBM. The operation and implementation of the DFSMS system are described in IBM publications "DFSMS/MVS VIR3 General Information," IBM document no. GC26-490004 (IBM Copyright, 1980, 1995) and "DFSMS/MVS VIR3 DFSMShsm Storage Administration Guide," IBM document no. SH21-1076-02 (IBM Copyright 1984, 1995), which publications are incorporated herein by reference in their entirety.

Certain prior art HSM programs, tape operating systems, and data storage devices utilize a 22-bit block id format. Using a block size of 16 kilobytes, such a 22-bit block-id format can accommodate a maximum number of about 4,000,000 blocks. When this maximum number of blocks is encountered, the data storage subsystem returns a logical end-of-tape indication, and the volume, i.e. the tape, is regarded by the host computer as "filled" regardless of the actual physical space still available. On the other hand, use of a 32 bit file block addressability mode allows storage of more than 4,000,000,000 blocks per volume, such as a magnetic tape.

What is needed is a data storage device and method that support the capability to switch between alternative block-id architectures, for example between a 22 bit block-id format and a 32 bit block-id format, and vice versa Applicants' invention includes such a data storage device and a such a method.

SUMMARY OF THE INVENTION

Applicant's invention includes a data storage device comprising a fixed device architecture, where that data storage device is capable of operating in a first capacity mode or in a second capacity mode, and where that data storage device is capable of switching between the first capacity mode and the second capacity mode. In certain embodiments, the first capacity mode utilizes a 22 bit block-id format and the second capacity mode utilizes a 32 bit block-id format. In other embodiments, the first capacity mode utilizes a 32 bit block-id format and the second capacity mode utilizes a 22 bit block-id format.

Applicants' invention further includes a method wherein Applicants' data storage device receives a request from a host computer to record designated information on a designated data storage media using a specified capacity mode. In response to that request, Applicants' method switches the data storage device from its default capacity mode to the specified capacity mode, and then records the designated information on the designated data storage medium using that specified capacity mode.

Applicants' invention further includes a computer code product comprising a data management system which supports the capability to switch between alternative information storage architectures, and thereby, increase the capacity utilization of data storage media. Applicants' invention further includes a data storage and retrieval system which includes one or more of Applicants' data storage devices.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the figures. The invention will be described as embodied in an automated data storage and retrieval subsystem for use in a data processing environment. The following description of Applicant's method to record information to a movable tape medium, or to a movable tape medium disposed within a portable data storage cartridge is not meant, however, to limit Applicant's invention to either data storage and retrieval systems, or to magnetic tape applications, as the invention herein can be applied to data storage media in general.

Figure 3:
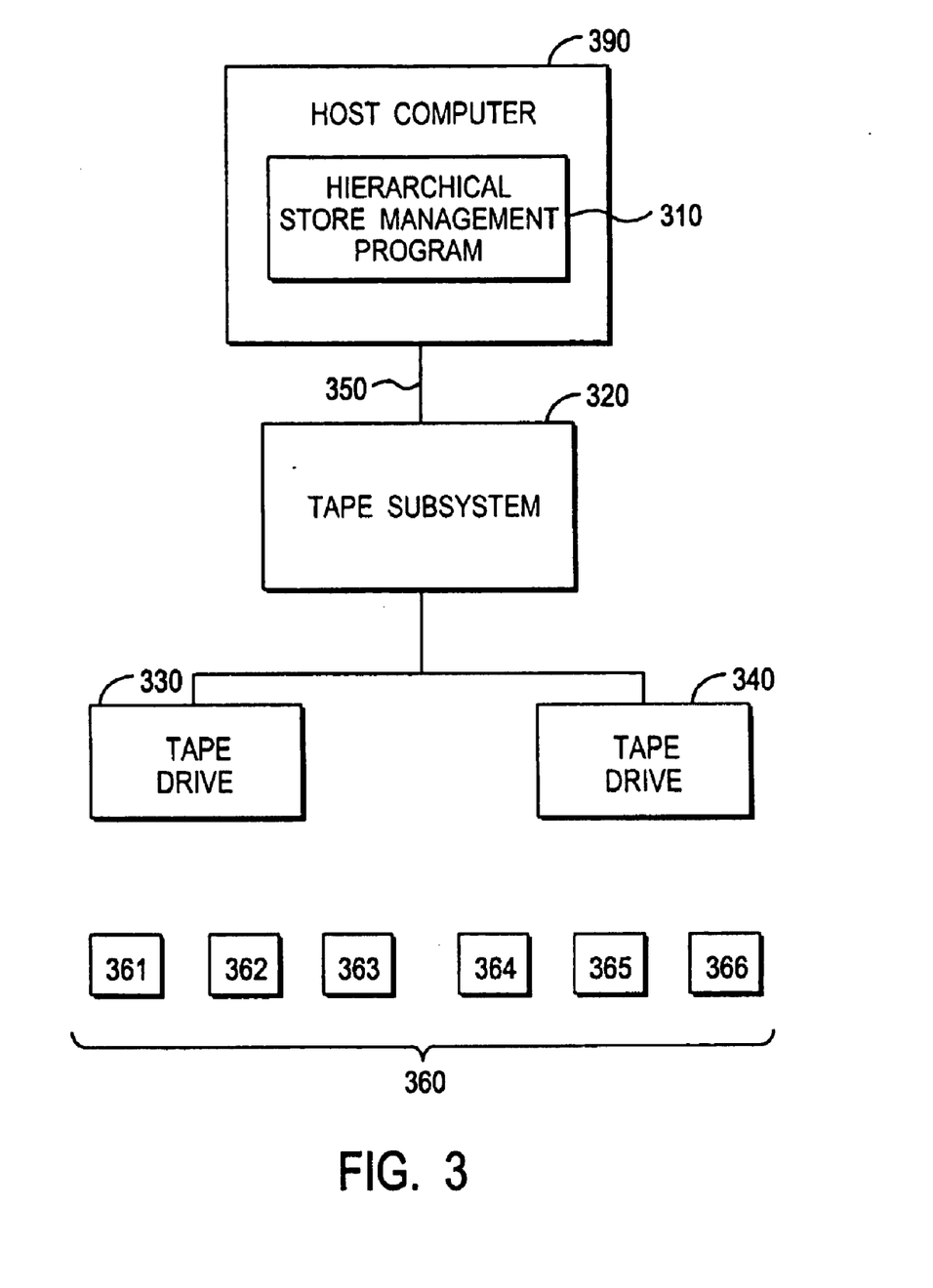
FIG. 3 is a block diagram showing the hardware and software components of Applicants' data storage and retrieval system.

FIG. 3 illustrates the hardware and software environment in which preferred embodiments of the present invention are implemented. Host system 390 includes Applicants' hierarchical storage management (HSM) program 310. Information is transferred between the host system 390 and secondary storage devices managed by a data storage and retrieval system, such as tape subsystem 320, via communication link 350. Communication link 350 comprises a serial interconnection, such as an RS-232 cable or an RS432 cable, an ethernet interconnection, an ESCON interconnection, a FICON interconnection, a SCSI interconnection, a Fibre Channel interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In the embodiment shown in FIG. 3, tape subsystem 320 includes tape drives 330 and 340. In other embodiments of Applicants' data storage and retrieval system, tape subsystem 320 includes a single data storage drive. In alternative embodiments, Applicants' data storage and retrieval system 320 includes more than two data storage drives.

A plurality of portable data storage media 360 are stored within Applicants' data storage and retrieval system. In certain embodiments, plurality of data storage media 360 are each housed in a portable data storage cartridge 370, such as plurality of portable tape cartridges 370 (not shown in FIG. 3). Each of such portable data storage cartridges may be inserted in one of tape drives, and thereafter accessed by the tape subsystem 320. In alternative embodiments, alternative storage media may be substituted for the tape cartridges 370. Any type of non-volatile storage media could be used, including optical disks, holographic units, digital video disc (DVD), compact disc-read only memory (CD-ROM), non-volatile random access memory (RAM), etc.

The tape subsystem 320 further includes program logic to manage tape drives 330 and 340, and plurality of tape cartridges 370. In alternative embodiments, tape subsystem 330 and host system 390 may be located on a single computer machine.

Host system 390 comprises a computer system, such as a mainframe, personal computer, workstation, etc., including an operating system such as Windows, AIX, Unix, MVS, etc. (Windows is a registered trademark of Microsoft Corporation; AIX is a registered trademark and MVS is a trademark of IBM Corporation; and UNIX is a registered trademark in the United States and other countries licensed exclusively through The Open Group.) The HSM program 310 in the host system 390 may include the functionality of HSM type programs known in the art that manage the transfer of data to a tape library, such as the IBM DFSMS implemented in the IBM MVS operating system.

The IBM DFSMS software is described in "DFSMS/MVS VlR4 General Information," IBM document no. GC26-4900-05, published by IBM (Copyright 1997, IBM), which publication is incorporated herein by reference in its entirety. In addition to including known HSM functions, such as recall and migration, the HSM program 310 would further include additional program instructions to perform the operations of the preferred embodiments of the present invention. The HSM program 310 may be implemented within the operating system of the host system 390 or as a separate, installed application program.

The tape subsystem 320 comprises a computer system, and manages a plurality of tape drives and tape cartridges. The tape drives 330 and 340 may be any suitable tape drives known in the art, e.g., the Magstar 3590 tape drives. Tape cartridges 370 may be any suitable tape cartridge device known in the art, (Magstar is a registered trademark of IBM Corporation) such as ECCST, Magstar, IBM 3420, 3480, 3490E, 3590 tape cartridges, etc. The tape subsystem 320 may be a manual tape library in which the user must manually mount tape cartridges 370 into the tape drives 330/340, or an automated tape library (ATL) in which a robotic arm mounts tape cartridges 370 in the library into the tape drives 330/340.

For example referring now to FIG. 1, automated data storage and retrieval system 100 is shown having a first wall of storage slots 102 and a second wall of storage slots 104. Portable data storage cartridges, such as tape cartridges 370, are individually stored in these storage slots.

Figure 1A:
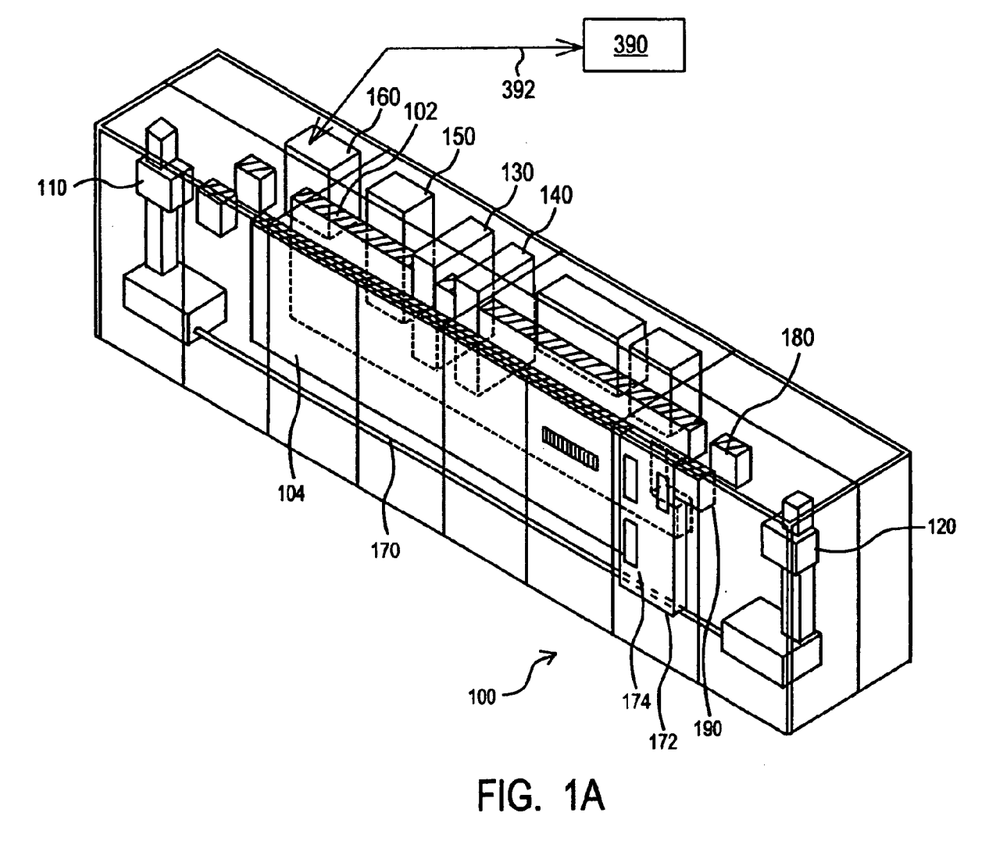
FIG. 1A is a perspective view of a first embodiment of Applicants' data storage and retrieval system.
Figure 1B:
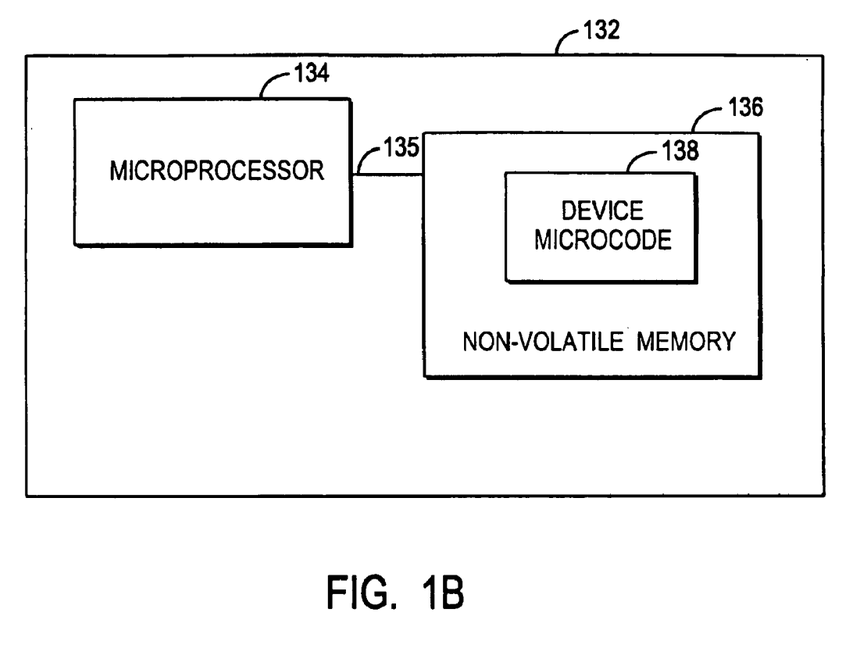
FIG. 1B is a block diagram showing certain components disposed in the controller disposed in Applicants' data storage and retrieval system.

Data storage and retrieval system 100 includes one or more accessors, such as accessors 110 and 120. An accessor is a robotic device which accesses portable data storage media from first storage wall 102 or second storage wall 104, delivers that accessed media to data storage devices 130/140 for reading and/or writing data thereon, and returns the media to the proper storage slot. Referring now to FIG. 1B, data storage device 130 includes device controller 132. Controller 132 includes microprocessor 134 in communication with non-volatile memory 136. In certain embodiments, microprocessor 134 communicates with non-volatile memory 136 via communication link 135. In other embodiments, non-volatile memory 136 is integral to microprocessor 134. Device microcode 138 is stored in non-volatile memory 136. Device microcode comprises a computer program product which controls the operation of a data storage device, such as data storage device 130 (FIG. 1A)/140 (FIG. 1A)/230 (FIG. 2).

Figure 1C:
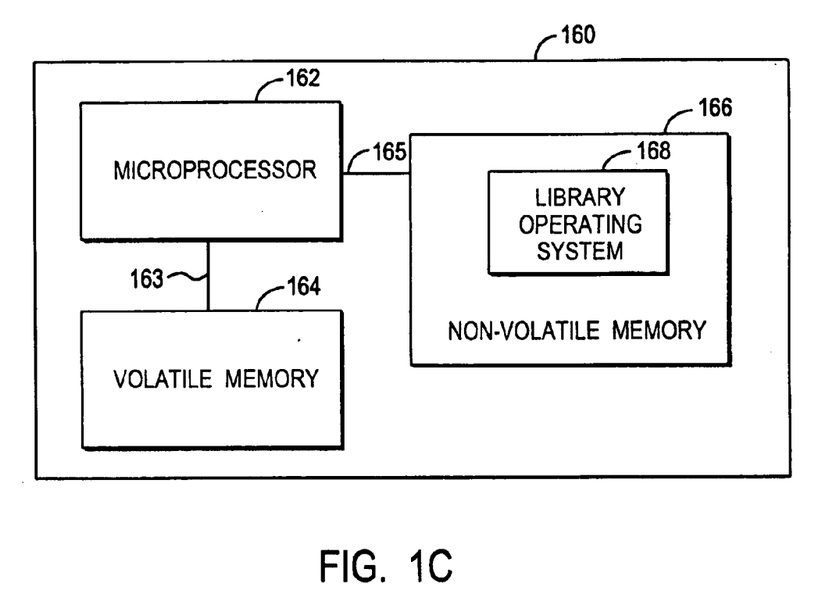
FIG. 1C is a block diagram showing certain components disposed in Applicants' data storage device.

Library controller 160 controls the operation of data storage and retrieval system 100. In certain embodiments, controller 160 is integral to host computer 390. In alternative embodiments, controller 160 is external to host 390. In those external controller embodiments, library controller 160 communicates with host computer 390 via communication link 392. Referring now to FIG. 1C, library controller 160 includes microprocessor 162, volatile memory 164, and non-volatile memory 166. In certain embodiments, microprocessor communicates with volatile memory 164 via communication link 163. In other embodiments, volatile memory 164 is integral to microprocessor 162. Microprocessor 162 communicates with non-volatile memory 166 via communication link 165. Operating system 168 is stored in non-volatile memory 166. Operating system 168 comprises a computer program product which controls the operation of data storage and retrieval systems 100 (FIG. 1A)/200 (FIG. 2), and tape subsystem 320 (FIG. 3).

Operator input station 150 permits a user to communicate with Applicant's automated data storage and retrieval system 100. Devices 180 and 190 each comprise a Direct Access Storage Device ("DASD") cache. In certain embodiments DASD cache 180 and 190 comprise a plurality of hard disk drives which are configured into one or more RAID arrays. In certain embodiments, information transferred between host computer 390 and data storage and retrieval system 100 is buffered in DASD caches 180 and 190. Import/export station 172 includes access door 174 pivotably attached to the side of system 100. Portable data storage cartridges can be placed in the system, or in the alternative, removed from the system, via station 172/access door 174.

Figure 2:
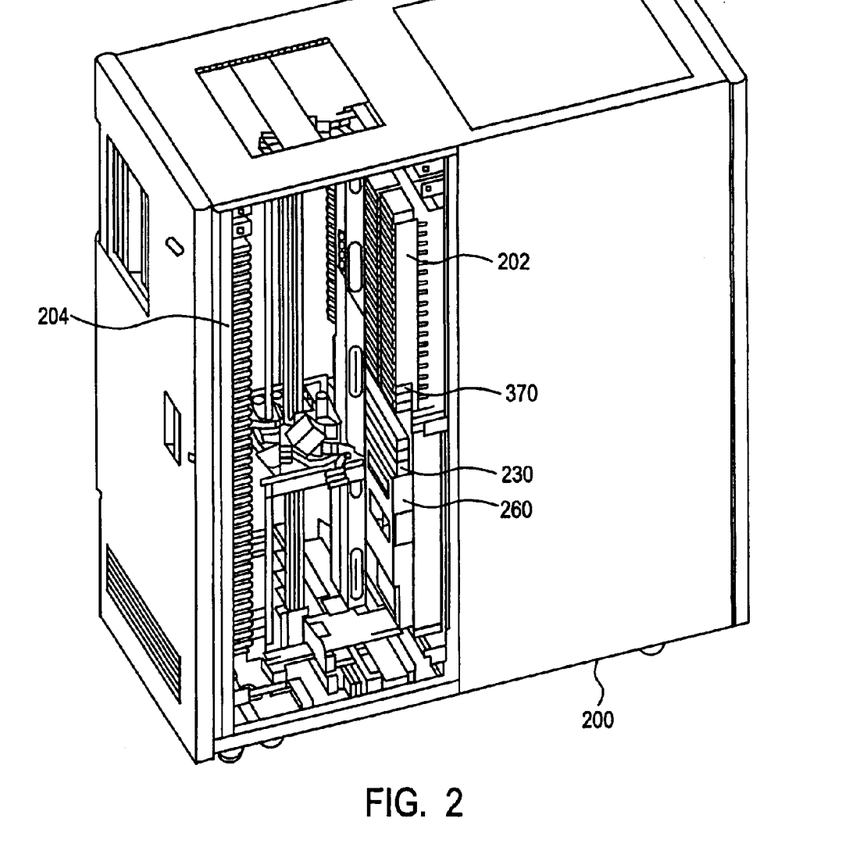
FIG. 2 is a perspective view of a second embodiment of Applicants' data storage and retrieval system.

FIG. 2 shows system 200 which comprises another embodiment of Applicant's data storage and retrieval system. System 200 includes first storage wall 202 and second storage wall 204. Storage walls 202 and 204 each include a plurality of storage elements in which can be stored a plurality of portable data storage cartridges. System 200 includes one or more data storage devices, such as device 230. Device 230 comprises a floppy disk drive, an optical disk drive, a magnetic tape drive, and the like. System 200 further includes operator control panel 250 (not shown in FIG. 3).

System 200 further includes library controller 260. Library controller 260 controls the operation of assessor 210 and data storage device 230. System 300 further includes one or a plurality of portable data storage cartridges, such as tape cartridges 360 (FIG. 3). Each cartridge contains a data storage media internally disposed therein, such as data storage media 360 (FIG. 3).

Referring again to FIG. 3, tape subsystem 320, such as data storage and retrieval system 100/200, receives commands from the HSM program 310 in the host system 390 and performs the operations requested by the HSM program 310, such as migration and recall, to transfer data between the host system 390 and the components managed by the tape subsystem 320. In preferred embodiments, the tape subsystem 320 can simultaneously process numerous input/output requests from the host system 390 and any other attached system directed toward the tape drives 330/340 and tape cartridges 370 managed by the tape subsystem 320. Moreover, in certain embodiments HSM program 310 in the host system 390 is capable of multi-tasking, simultaneously executing numerous input/output operations, and simultaneously transmitting multiple I/O requests to the tape subsystem 320 to execute.

In further embodiments, a plurality of host systems 390 may communicate with the tape subsystem 320 and/or a host system 390 may communicate and transfer data to a plurality of tape subsystems 320, each subsystem providing access to a library of tape cartridges.

Figure 4:
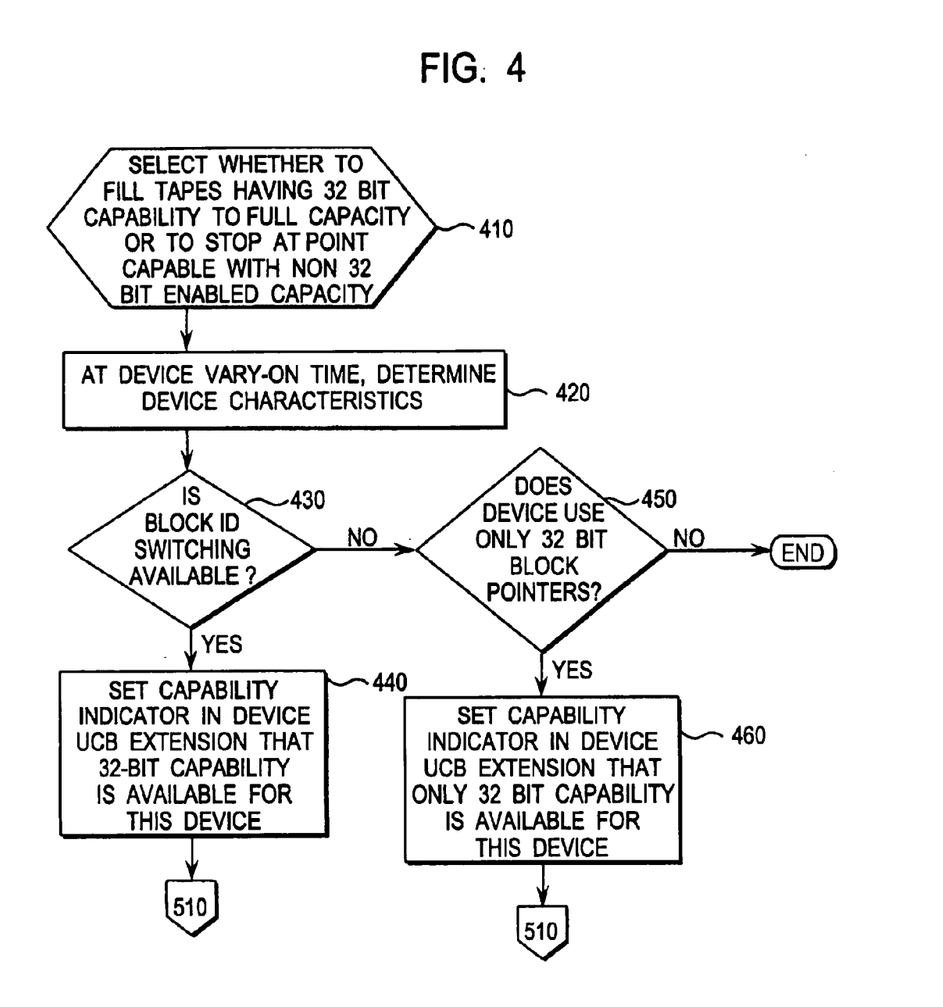
FIG. 4 is a flowchart summarizing the steps in Applicants' method to configure a data storage device to use alternative information storage architectures.

FIG. 4 summarizes the initial steps in Applicants' method to adaptively support the capability to switch between use of alternate block-id architectures. In step 410, the library user initially configures the devices comprising the data storage and retrieval system, including the data storage drives, such as drives 130 (FIG. 1), 140 (FIG. 1), and 230 (FIG. 2). In certain embodiments, the user configures a data storage device using a SETSYS TAPEUTILIZATION command.

In certain embodiments, operating system 168 (FIG. 1B) includes a SETSYS TAPEUTILIZATION command, a SETSYS USERUNITTABLE command, and a USERUNITABLE. In these embodiments, the user's selected configurations for data storage devices disposed within the data storage and retrieval system are stored in the USERUNITTABLE using the SETSYS USERUNITTABLE command.

Configuring a device using the SETSYS TAPEUTILIZATION command includes specifying a CAPACITYMODE attribute for that device. This CAPACITYMODE attribute comprises part of the operating system 168. In certain embodiments, the CAPACITYMODE attribute has two extensions, namely COMPATIBILITY and EXTENDED.

When the user configures a device, such data storage device 130/140/230 using the CAPACITYMODE (EXTENDED) attribute, then that device is enabled to utilize the 32 bit block-id architecture, thereby allowing complete utilization of the physical space available on a data storage tape medium mounted therein. Information recorded on tapes using the 32 bit block-id architecture is generally only accessible to CAPACITY MODE(EXTENDED) data storage devices.

On the other hand, if the user configures a data storage device using the CAPACITYMODE(COMPATIBILITY) attribute, then that device will record information on data storage media using the 22 bit block-id architecture. Information recorded on tapes using the 22 bit block id architecture is generally accessible to both CAPACITYMODE switchable devices and devices not having CAPACITYMODE switching support.

In step 420, the operating system at the data storage device vary-on time, ascertains the information storage architecture capabilities of that device. By information architecture, Applicants' mean the block-id format capabilities of the data storage device. In certain embodiments, the operating system queries the device using a READ DEVICE CHARACTERISTICS ("RDC") command. In these embodiments, Applicants' operating system, such as operating system 168 (FIG. 1C), includes such an RDC command.

In certain embodiments, Applicants' operating system includes a READ MEDIUM CHARACTERISTICS ("RMC") command. Such a RMC command queries a data storage device to determine that device's Block Pointer Format. The data storage device's microcode includes two bits which comprise that device's Addressing Flags. If the first addressing flag bit is set, then the device is capable of using a 22 bit block-id format. If the second addressing flag bit is set, then the device is capable of using a 32 bit block-id format. If both the first addressing flag bit and the second addressing flag bit are set, then that device is capable of switching between a 22 bit block-id format and a 32 bit block-id format. At the device vary on time, the device is automatically configured to utilize the information storage architecture reported by the RMC command.

In step 430, the operating system, using information obtained from the RDC/RMC command(s), ascertains if the data storage device includes CAPACITYMODE switching support. Thereafter, in step 440 the operating system sets a capability indicator in the data storage device's Unit Control Block extension ("UCB extension") to show that 32 bit capability is available for that device.

In certain embodiments, operating system 168 includes a UCBCX_BLKPTR_SWITCH attribute. In these embodiments, the library controller, such as controller 160 (FIGS. 1A, 2), indicates that CAPACITYMODE switching capability is available by setting the device's UCBCX_BLKPTR_SWITCH attribute to "ON." In the event in step 450 the library controller determines by interrogating a data storage device using the RDC/RMC command that that device is only capable of using 32 bit block pointers, then in step 460 the controller sets a capability indicator in the data storage device's UCB to show only 32 bit capability is available for that device. In certain embodiments, operating system 168 includes a UCBCX_32BIT_BLKPTR attribute. In these embodiments, in step 460 the controller sets the device's UCBCX_32BIT_BLKPTR attribute to "ON" to indicate that the data storage device can only use a 32 bit block-id format.

Figure 5:
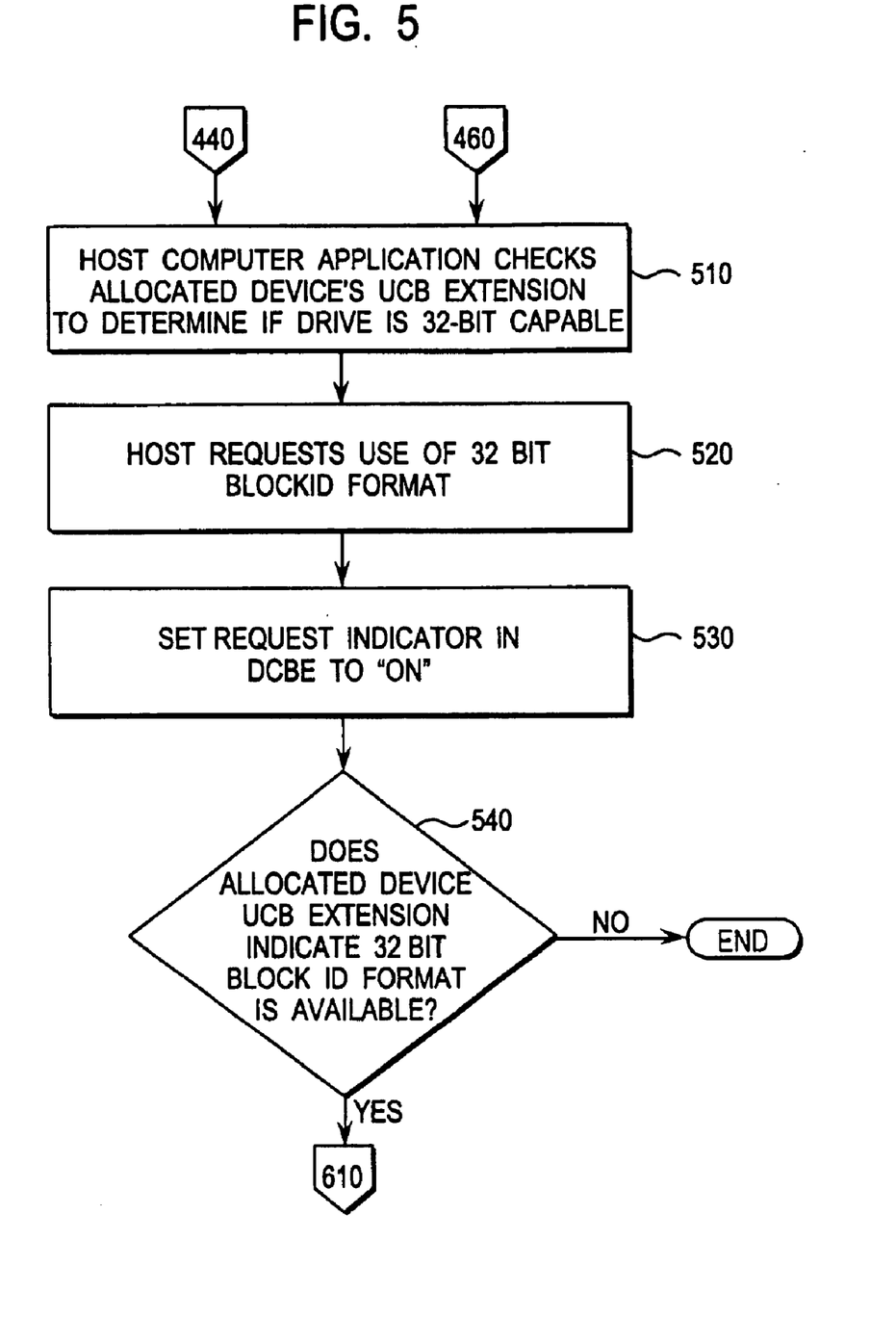
FIG. 5 is a flowchart summarizing the steps in Applicants' method whereby an application running on a host computer requests a certain information storage architecture be used to record certain designated data on a designated data storage medium.

FIG. 5 summarizes the steps of Applicants' method by which an application running on a host computer, such as host computer 390 (FIG. 3), can utilize the CAPACITY-MODE switching capability of Applicants' data storage management system. In step 510, the host computer application checks the allocated data storage drive's UCB extension to ascertain if that device is 32 bit block-id format capable.

If the application determines in step 510 that the allocated device is 32 bit block-id format capable, and if the user has requested use of the 32 bit block-id format, then in step 520 the application requests use of the 32 bit block-id format when writing certain designated information to a designated data storage medium. In certain embodiments of Applicant's method and computer code product, the application, such as HSM 310, includes a CAPACITYMODE=XCAP command. In these embodiments, the request of step 520 to use a 32 bit block-id format comprises issuing a CAPACITYMODE=XCAP command.

Applications running on host computer 390 include an application programming interface ("APr") which describes the attributes of the data set, i.e. the file, to be recorded on the designated data storage medium. In certain embodiments of Applicants' method, this API comprises a Dataset Control Block ("DCB"). Such a DCB further comprises a Dataset Control Block Extension ("DCBE") which includes parameters which can be manipulated independently of the application itself. Moreover, such a DCBE is dynamically changeable by the application at the dataset level. In certain embodiments, Applicants' DCBE includes a DCBE_REQST_XCAP attribute. In these embodiments, issuing a CAPACITYMODE=XCAP command by the host computer application causes the DCBE_REQST_XCAP attribute to be set to "ON."

In the event the operating system ascertains that the host computer application is requesting use of the 32 bit block-id format, then in step 540 the operating system checks the allocated device's UCB to verify that the allocated data storage device, such as data storage device 130 (FIG. 1)/140 (FIG. 2)/230 (FIG. 2), is 32 bit block-id format capable. In the event the operating system verifies such 32 bit capability, then Applicants' method transitions to step 610.

Figure 6:
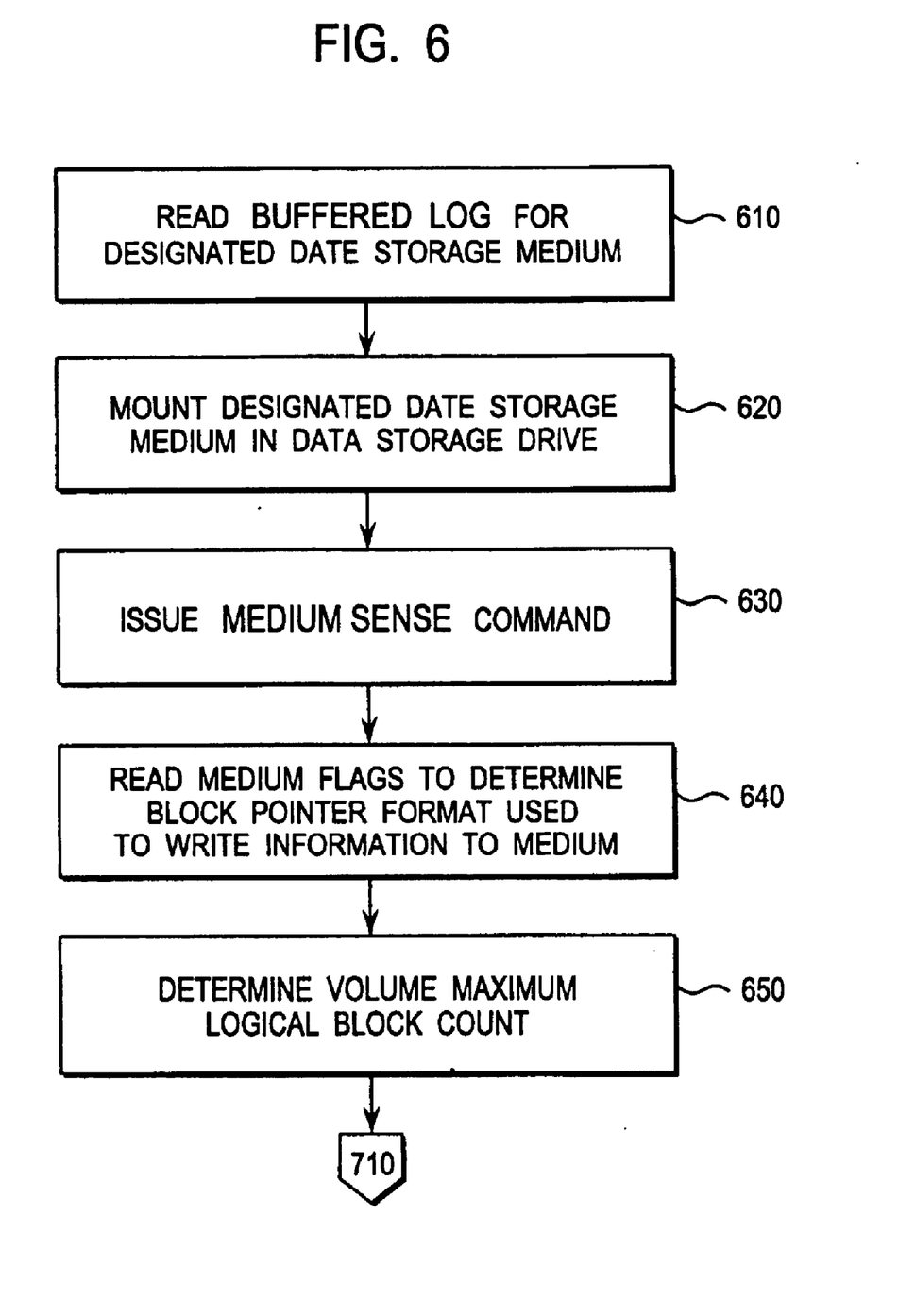
FIG. 6 is a flowchart summarizing additional steps in Applicants' method whereby an application running on a host computer requests a certain information storage architecture be used to record certain designated data on a designated data storage medium.

In certain embodiments, Applicants' operating system includes a buffered log comprising information about the various data storage media moveably disposed in Applicants' data storage and retrieval system. In these embodiments, in step 610 the operating system reads that buffered log to determine certain attributes of the data storage medium designated by the host computer. In the event a first bit is set in the buffered log for the designated data storage medium, then the operating system determines that the Logical End Of Volume ("LEOV"), but not the Physical End Of Volume ("PEOV"), has been reached when using a 22 bit block-id format. In such an event, the operating system determines that a data storage device using a 22 bit block-id format can read, but not write, to that designated medium.

In the event a second bit is set in that buffered log, then the operating system determines that for purposes of using a 22 bit block-id format, the PEOV has been reached. In such an event, the operating system determines that designated the medium cannot be fully read in a 22-bit addressing mode. If a third bit is set in the buffered log, then the operating system determines that the medium has been formatted with more than one partition at the time the log was generated.

In step 620, the designated data storage medium is mounted in the allocated data storage device. In step 630, the operating system issues a MEDIUM SENSE command which causes the data storage device to read certain MEDIUM FLAGS stored in the designated medium to determine the Block Pointer Format, i.e. the block-id format, previously used to write information to the designated medium. In certain embodiments, these MEDIUM FLAGS are written in the Volume Control Region ("VCR") of the medium. In certain embodiments, these MEDIUM FLAGS are written in a memory device disposed in the cassette housing the designated medium. Such portable data storage cartridges are sometimes referred to as Memory In Cassette ("MIC") data storage cartridges. In certain embodiments, if MEDIUM SENSE determines that the data storage device must use a 32 bit block-id format to access all the information on the designated medium, then the operating system automatically invokes a 32 bit block-id format.

Figure 7:
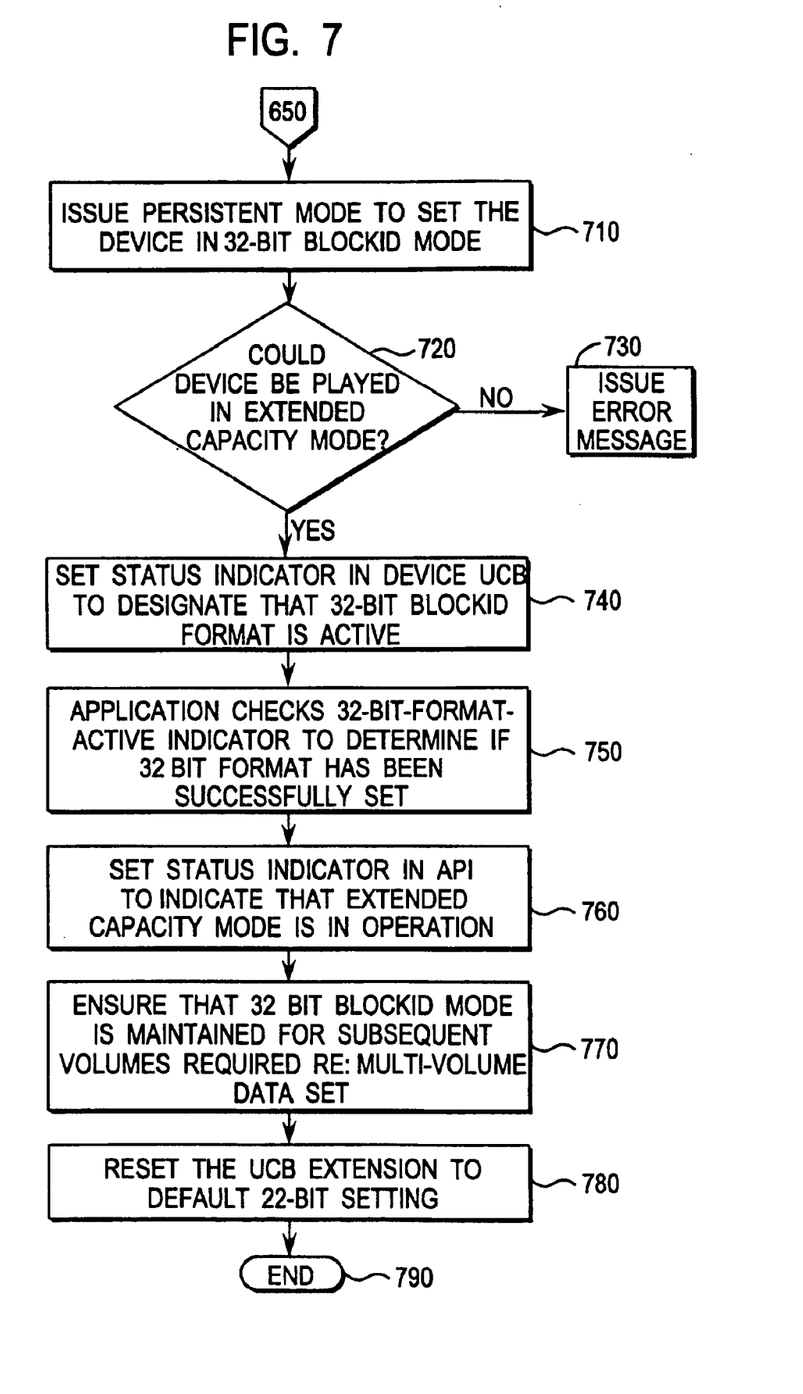
FIG. 7 is a flowchart summarizing additional steps in Applicants' method whereby an application running on a host computer requests a certain information storage architecture be used to record certain designated data on a designated data storage medium.

In step 640, the data storage device determines the VOLUME MAXIMUM LOGICAL BLOCK COUNT. This VOLUME MAXIMUM LOGICAL BLOCK COUNT represents the logical block number associated with the position just prior to the first end-of-data mark disposed on the designated data storage medium. This VOLUME MAXIMUM LOGICAL BLOCK COUNT is used by the operating system to determine the readability of that medium by a host attaching a 22 bit block-id format data storage device. After determining the VOLUME MAXIMUM LOGICAL BLOCK COUNT, Applicants' method transitions to step 710.

In step 710, the operating system issues a command to switch the allocated data storage device to the 32 bit block-id format. In certain embodiments, operating system 168 (FIG. 1C) includes a MODE SET(X) command. In these embodiments, operating system 168 issues such a MODE SET(X) command to place the data storage device in the 32 bit block-id format. In step 720, the operating system verifies that the allocated device was successfully switched to the extended capacity mode, i.e. to the 32 bit block-id format. In the event the operating system determines in step 720 that the allocated drive was not successfully placed in the extended capacity mode, then the operating system issues an error message in step 730.

In the event the operating system determines in step 720 that the allocated data storage device was successfully placed in the extended capacity mode, then in step 740 the operating system sets a status indicator in the device's UCB extension showing that the 32 bit block-id format is now active in that device. In certain embodiments, operating system 168 (FIG. 1C) includes a UCBCX_32BIT_INUSE attribute. In these embodiments, the UCBCX_32BIT_NUSE attribute to is set to "ON" in step 640.

In step 750, host computer 390 verifies operation of the allocated data storage device in the extended capacity mode by checking the allocated data storage device's UCB to determine if the UCBCX_32BIT_INUSE attribute is set to "ON." If host computer 390 determines that the allocated device is operating in the 32 bit block-id format, then in step 760 host 390 sets a status indicator in the host computer application's API showing that the allocated data storage device is operating in the extended capacity mode. In certain embodiments, that API includes a DCBE_32BIT-INUSE attribute. In these embodiments, in step 760 the DCBE_32BIT-INUSE attribute associated with the allocated storage device is set to "ON" indicating that the allocated device is operating in the extended capacity mode.

In the event subsequent volumes, such as one or more of data storage media 361, 362, 363, etc., are mounted for a multi-volume data set, host computer 390 in step 770 ensures that the 32 bit block-id format is maintained when writing information to those subsequent volumes. In certain embodiments, Applicants' operating system includes Device Control Pages for each available data storage device. In certain embodiments, such Device Control Pages include an APPLY MODE DEFAULTS attribute. If the APPLY MODE DEFAULTS attribute for the allocated data storage device is set to "OFF," then the Block Pointer Format, i.e. the selected block-id format, is maintained for subsequent volumes. On the other hand, if the APPLY MODE DEFAULTS attribute is set to "ON," then the block-id format for a new volume is reset to the default setting reported by the RMC command. To ensure that a 32 bit block-id format mode is maintained for subsequent volumes, the host computer sets the APPLY MODE DEFAULTS attribute to "OFF" for the allocated data storage device.

During data set closing operations, the operating system in step 680 resets the data storage device's UCB extension to the default 22 bit setting. In addition, during data set closing the data storage device updates the VOLUME MAXIMUM LOGICAL BLOCK COUNT attribute in the designated data storage medium's VCR and/or MIC. In addition, the buffered log for the designated data storage medium is updated.

Applicants' invention includes a data storage device comprising a computer useable medium having computer readable program code disposed therein for implementing Applicants' method to record information in alternative information storage architectures. Applicants' invention further comprises a data storage and retrieval system which includes one or more of Applicants' data storage devices.

Applicants' invention further includes a data management system comprising computer program products embodied as program code stored in one or more memory devices, such as a magnetic disk, a magnetic tape, or other non-volatile memory device disposed in Applicants' data storage device. The programming of the present invention may comprise a computer program product embodied as program code stored in a storage device, such as a magnetic disk drive or memory, etc., in a computer, or may comprise an article of manufacture, such as a CD ROM, magnetic tape, etc.

While the preferred embodiments of the present invention have been illustrated in detail, it should be apparent that modifications and adaptations to those embodiments may occur to one skilled in the art without departing from the scope of the present invention as set forth in the following claims.

We claim:

1. A data storage and retrieval system, comprising:
a data storage device having a fixed device architecture, wherein said data storage device is capable of operating in a default capacity mode or in an extended capacity mode, and wherein said data storage device is capable of switching between said default capacity mode and said extended capacity mode;
an operating system, wherein said operating system comprises a capability indicator and a status indicator, wherein said capability indicator indicates that said data storage device is capable of operation in said default capacity mode and/or in said extended capacity mode, and wherein said status indicator indicates whether said data storage device is operating in said default capacity mode or in said extended capacity mode.

2. The data storage and retrieval system of claim 1, wherein said operating system further comprises a unit control block extension comprising a UCBCX_BLKPTR_SWITCH attribute, wherein said UCBCX_BLKPTR_SWITCH attribute is set to ON if said data storage device can be switched between said default capacity mode and said extended capacity mode.

3. The data storage and retrieval system of claim 1, wherein said operating system further comprises a unit control block extension comprising a UCBCX_32BIT_INUSE attribute, wherein storage device is operating in said extended capacity mode if said UCBCX_32BIT_INUSE attribute is set to ON.

4. The data storage and retrieval system of claim 1, wherein said operating system further comprises Device Control Pages for said data storage device, wherein said Device Control Pages include an APPLY MODE LAW OFFICE OF DEFAULTS attribute.

5. The data storage and retrieval system of claim 4, wherein said APPLY MODE DEFAULTS attribute is set to OFF.

6. The data storage and retrieval system of claim 4, wherein said APPLY MODE DEFAULTS attribute is set to ON.

7. A method to record information on a data storage medium, comprising the steps of:
providing a data storage device having a fixed device architecture, wherein said data storage device is capable of operating in a first capacity mode or in an second capacity mode, wherein said data storage device is capable of switching between said first capacity mode and said second capacity mode;
providing a designated data storage medium;
providing designated information;
removeably disposing said designated data storage medium in said data storage device;
receiving a request to record said designated information on said designated data storage media using said second capacity mode;
switching said data storage device to said second capacity mode; and
recording said designated information on said designated data storage medium using said second capacity mode.

8. The method of claim 7, wherein said first capacity mode uses a 22 bit block-id format, and wherein said second capacity mode uses a 32 bit block-id format.

9. The method of claim 7, wherein said first capacity mode uses a 32 bit block-id format, and wherein said second capacity mode uses a 22 bit block-id format.

10. The method of claim 7, further comprising the step of switching said data storage device to said first capacity mode from said second capacity mode after recording said designated information on said designated storage media.

11. The method of claim 7, further comprising the steps of:
providing a plurality of data storage media;
sequentially removeably disposing each of said plurality of data storage media in said data storage device;
recording said information on said plurality of data storage media; and
ensuring that second capacity mode is maintained while recording said information on said plurality of data storage media.

12. The method of claim 7, further comprising the step of configuring said data storage device to permit use of said first capacity mode and said second capacity mode.

13. The method of claim 7, further comprising the steps of:
determining whether said data storage device is capable of second capacity mode operation; and
setting a capability indicator to indicate whether said data storage device is capable of using said second capacity mode.

14. The method of claim 13, wherein said determining step further comprises the step of issuing a READ DEVICE CHARACTERISTICS command.

15. The method of claim 13, wherein said determining step further comprises the step of issuing a READ MEDIUM CHARACTERISTICS command.

16. The method of claim 7, further comprising the steps of:
issuing a command to switch said data storage device from said first capacity mode to said second capacity mode;
determining if said data storage device was switched from said first capacity mode to said second mode capacity;
providing an error message in the event said data storage device was not switched from said first mode capacity to said second mode capacity; and
setting a status indicator in the event said data storage device was switched from said first mode capacity to said second mode capacity.

17. The method of claim 7, further comprising the step of issuing a MEDIUM SENSE command.

18. The method of claim 7, wherein said designated data storage medium comprises a Volume Control Region and Medium Flags stored in said Volume Control Region, said method further comprises the step of reading said Medium Flags to determine the capacity mode previously used to write information to said designated data storage medium.

19. The method of claim 7, wherein said designated data storage medium is housed in a cassette comprising a memory device and Medium Flags stored in said memory device, said method further comprising the step of reading said Medium Flags to determine the capacity mode previously used to write information to said designated data storage medium.

20. The method of claim 7, further comprising the step of determining the Volume Maximum Logical Block Count for said designated data storage medium.

21. A data storage and retrieval system comprising a computer useable medium having computer readable program code disposed therein for storing designated information on a designated data storage medium using alternative information storage architectures, wherein said data storage and retrieval system includes an on-line host computer, an operating system, and a data storage device having a fixed device architecture, wherein said data storage device is capable of operating in a first capacity mode or in an second capacity mode, wherein said data storage device is capable of switching between said first capacity mode and said second capacity mode, the computer readable program code comprising a series of computer readable program steps to effect:
receiving said designated information;
removeably disposing said designated data storage medium in said data storage device;
receiving a request to record said designated information on said designated data storage media using said second capacity mode; and
placing said data storage device in said second capacity mode.

22. The data storage and retrieval system of claim 21, wherein said first capacity mode uses a 22 bit block-id format, and wherein said second capacity mode uses a 32 bit block-id format.

23. The data storage and retrieval system of claim 21, wherein said first capacity mode uses a 32 bit block-id format, and wherein said second capacity mode uses a 22 bit block-id format.

24. The data storage and retrieval system of claim 21, wherein said computer readable program code further comprises a series of computer readable program steps to effect switching said data storage device to said first capacity mode from said second capacity mode after recording said designated information on said designated storage media.

25. The data storage and retrieval system of claim 21, wherein said computer readable program code further comprises a series of computer readable program steps to effect:
sequentially removeably disposing each of a plurality of data storage media in said data storage device;
recording said designated information on said plurality of data storage media; and
ensuring that second capacity mode is maintained while recording said information on said plurality of data storage media.

26. The data storage and retrieval system of claim 25, wherein said operating system further comprises an APPLY MODE DEFAULTS attribute, further comprises a series of computer readable program steps to effect setting said APPLY MODE DEFAULTS attribute to OFF.

27. The data storage and retrieval system of claim 21, wherein said computer readable program code further comprises a series of computer readable program steps to effect configuring said data storage device to permit use of said second capacity mode.

28. The data storage and retrieval system of claim 21, wherein said computer readable program code further comprises a series of computer readable program steps to effect:
determining whether said data storage device is capable of second capacity mode operation; and
setting a capability indicator in said operating system to indicate whether said data storage device is capable of using said second capacity mode.

29. The data storage and retrieval system of claim 21, wherein said operating system includes a READ DEVICE CHARACTERISTICS command, wherein said computer readable program code further comprises a series of computer readable program steps to effect issuing said READ DEVICE CHARACTERISTICS command.

30. The data storage and retrieval system of claim 21, wherein said operating system includes a READ MEDIUM CHARACTERISTICS command, wherein said computer readable program code further comprises a series of computer readable program steps to effect issuing said READ MEDIUM CHARACTERISTICS command.

31. The data storage and retrieval system of claim 21, wherein said computer readable program code further comprises a series of computer readable program steps to effect:
determining if said data storage device was switched from said first mode capacity to said second mode capacity,
providing an error message in the event said data storage device was not switched from said first mode capacity to said second mode capacity; and
setting a status indicator in the event said data storage device was switched from said first mode capacity to said second mode capacity.

32. The data storage and retrieval system of claim 21, wherein said operating system comprises a MEDIUM SENSE command, wherein said computer readable program code further comprises a series of computer readable program steps to effect issuing said MEDIUM SENSE command.

33. The data storage and retrieval system of claim 21, wherein said designated data storage medium comprises a Volume Control Region and Medium Flags stored in said Volume Control Region, wherein said computer readable program code further comprises a series of computer readable program steps to effect reading said Medium Flags to determine the capacity mode previously used to write information on said designated data storage medium.

34. The data storage and retrieval system of claim 21, wherein said designated data storage medium is housed in a cassette comprising a memory device and Medium Flags stored in said memory device, wherein said computer readable program code further comprises a series of computer readable program steps to effect reading said Medium Flags to determine the capacity mode previously used to write information to said designated data storage medium.

35. The data storage and retrieval system of claim 21, wherein said computer readable program code further comprises a series of computer readable program steps to effect determining the Volume Maximum Logical Block Count for said designated data storage medium.

36. A computer program product comprising a data management system usable with one or more computer processors disposed in a data storage and retrieval system, said computer program product having computer readable program code embodied therein for recording designated information on a designated data storage medium, and wherein said data storage and retrieval system includes a data storage device having a fixed device architecture, and wherein said data storage device is capable of operating in a first capacity mode or in an second capacity mode, wherein said data storage device is capable of switching between said first capacity mode and said second capacity mode, comprising:
computer readable program code which causes one of said one or more computer processors to provide designated information to said data storage device;
computer readable program code which causes one of said one or more computer processors to removeably dispose said designated data storage medium in said data storage device;
computer readable program code which causes one of said one or more computer processors to receive a request to record said designated information on said data storage media using said second capacity mode;
computer readable program code which causes one of said one or more computer processors to switch said data storage device to said second capacity mode from said first capacity mode; and
computer readable program code which causes one of said one or more computer processors to record said designated information on said data storage medium using said second capacity mode.

37. The computer program product of claim 36, wherein said first capacity mode uses a 22 bit block-id format, and wherein said second capacity mode uses a 32 bit block-id format.

38. The computer program product of claim 36, wherein said first capacity mode uses a 32 bit block-id format, and wherein said second capacity mode uses a 22 bit block-id format.

39. The computer program product of claim 36, further comprising computer readable program code which causes one of said one or more computer processors to switch said data storage device to said first capacity mode from said second capacity mode after said data storage device records said designated information on said designated data storage medium.

40. The computer program product of claim 36, further comprising:
computer readable program code which causes one of said one or more computer processors to sequentially removeably dispose each of a plurality of data storage media in said data storage device; and
computer readable program code which causes one of said one or more computer processors to ensure that second capacity mode is maintained while said information is being recorded on said plurality of data storage media.

41. The computer program product of claim 36, further comprising:
an APPLY MODE DEFAULTS attribute;
computer readable program code which causes one of said one or more computer processors to set said APPLY MODE DEFAULTS attribute to OFF.

42. The computer program product of claim 36, further comprising computer readable program code which causes one of said one or more computer processors to configure said data storage device to permit use of said second capacity mode.

43. The computer program product of claim 41, further comprising:
a unit control block extension;
computer readable program code which causes one of said one or more computer processors to determine whether said data storage device is capable of second capacity mode operation; and
computer readable program code which causes one of said one or more computer processors to set a capability indicator in said unit control block extension to indicate whether said data storage device is capable of using said second capacity mode.

44. The computer program product of claim 36, further comprising:
a READ DEVICE CHARACTERISTICS command; and
computer readable program code which causes one of said one or more computer processors to issue said READ DEVICE CHARACTERISTICS command.

45. The computer program product of claim 36, further comprising:
a READ MEDIUM CHARACTERISTICS command; and computer readable program code which causes one of said one or more computer processors to issue said READ MEDIUM CHARACTERISTICS command.

46. The computer program product of claim 36, further comprising:

computer readable program code which causes one of said one or more computer processors to determine if said data storage device was switched from said first mode capacity to said second mode capacity;

computer readable program code which causes one of said one or more computer processors to provide an error message in the event said data storage device was not switched from said first mode capacity to said second mode capacity; and computer readable program code which causes one of said one or more computer processors to set a status indicator in the event said data storage device was switched from said first mode capacity to said second mode capacity.

47. The computer program product of claim 36, further comprising:

a MEDIUM SENSE command; and computer readable program code which causes one of said one or more computer processors to effect issuing said MEDIUM SENSE command.

48. The computer program product of claim 36, wherein said designated data storage medium comprises a Volume Control Region, and Medium Flags stored in said Volume Control Region, further comprising computer readable program code which causes one of said one or more computer processors to effect reading said Medium Flags to determine the capacity mode previously used to write information to said designated data storage medium.

49. The computer program product of claim 36, wherein said designated data storage medium is housed in a cassette comprising a memory device and Medium Flags stored in said memory device, further comprising computer readable program code which causes one of said one or more computer processors to effect reading said Medium Flags to determine the capacity mode previously used to write information to said designated data storage medium.

50. The computer program product of claim 36, further comprising computer readable program code which causes one of said one or more computer processors to effect determining the Volume Maximum Logical Block Count for said designated data storage medium.

* * * * *